United States Patent
Tsunoda et al.

(10) Patent No.: US 9,618,953 B2
(45) Date of Patent: Apr. 11, 2017

(54) SYSTEM STABILIZATION SYSTEM (75) Inventors: Kazuyuki Tsunoda, Tokyo (JP); Atsushi Honzawa, Tokyo (JP); Shigeaki Nanba, Tokyo (JP); Hiroto Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 548 days.

(21) Appl. No.: 14/241,838

(22) PCT Filed: Aug. 30, 2011

(86) PCT No.: PCT/JP2011/069611
§ 371 (c)(1),
(2), (4) Date: Feb. 27, 2014

(87) PCT Pub. No.: WO2013/030952
PCT Pub. Date: Mar. 7, 2013

(65) Prior Publication Data
US 2014/0214223 A1 Jul. 31, 2014

(51) Int. Cl.
*G05D 3/12* (2006.01)
*G05F 1/66* (2006.01)
(Continued)

(52) U.S. Cl.
CPC .............. *G05F 1/66* (2013.01); *H02J 3/24* (2013.01); *H02J 3/32* (2013.01); *H02J 3/381* (2013.01);
(Continued)

(58) Field of Classification Search
CPC ........................................... G05F 1/66
(Continued)

(56) References Cited

U.S. PATENT DOCUMENTS

2002/0017822 A1* 2/2002 Umemura ............... H02J 7/345
307/66
2005/0206530 A1* 9/2005 Cumming .............. G01D 4/006
340/870.02
(Continued)

FOREIGN PATENT DOCUMENTS

EP  1 172 916 A2  1/2002
EP  2 001 098 A2  12/2008
(Continued)

OTHER PUBLICATIONS

Willett Kempton et al. "Vehicle-to-grid power implementation: From stabilizing the grid to supporting large-scale renewable energy." Science direct, 2005, pp. 281-294.*
(Continued)

*Primary Examiner* — Satish Rampuria
(74) *Attorney, Agent, or Firm* — Crowell & Moring LLP (57) ABSTRACT A system stabilization system for suppressing a power fluctuation in a power system, the system stabilization system including: a power storage apparatus configured to suppressing a power fluctuation in the power system by either charging or discharging in response to a control; a capacitor apparatus configured to suppress a power fluctuation in the power system by making the charge/discharge response to control faster than the power storage apparatus and charging or discharging in response to the control; and a control apparatus configured to control the power storage apparatus and the capacitor apparatus so as to reduce occurrences of charging or discharging in the power storage apparatus.

14 Claims, 9 Drawing Sheets (51) Int. Cl.
  *H02J 3/32*  (2006.01)
  *H02J 3/38*  (2006.01)
  *H02J 7/34*  (2006.01)
  *H02J 3/24*  (2006.01)

(52) U.S. Cl.
  CPC ............... *H02J 7/345* (2013.01); *H02J 3/382* (2013.01); *Y02E 70/30* (2013.01); *Y10T 307/516* (2015.04)

(58) Field of Classification Search
  USPC ................................................ 700/286–306
  See application file for complete search history.

(56) References Cited

U.S. PATENT DOCUMENTS

| | | | |
|---|---|---|---|
| 2008/0114499 | A1 | 5/2008 | Hakim et al. |
| 2008/0224541 | A1 | 9/2008 | Fukuhara |
| 2009/0295162 | A1 | 12/2009 | Oohara et al. |
| 2010/0117369 | A1* | 5/2010 | Monostory ............ F03D 13/20 290/55 |
| 2010/0127664 | A1 | 5/2010 | Paice et al. |
| 2010/0296204 | A1* | 11/2010 | Ichikawa ............... B60K 6/445 361/15 |
| 2012/0133333 | A1 | 5/2012 | Morioka et al. |
| 2012/0223670 | A1* | 9/2012 | Kinjo ....................... H02J 3/32 320/103 |
| 2012/0319471 | A1 | 12/2012 | Miller |

FOREIGN PATENT DOCUMENTS

| | | | | |
|---|---|---|---|---|
| EP | 2 190 097 | A1 | 5/2010 | |
| EP | 2 463 981 | A1 | 6/2012 | |
| EP | 2434147 | B1 * | 4/2016 | ........... F03D 7/0284 |
| FR | 2 939 248 | A1 | 6/2010 | |
| JP | 8-140285 | A | 5/1996 | |
| JP | 11-69658 | A | 3/1999 | |
| JP | 2000-295784 | A | 10/2000 | |
| JP | 2002-34179 | A | 1/2002 | |
| JP | 2002-44867 | A | 2/2002 | |
| JP | 2002-78205 | A | 3/2002 | |
| JP | 2007-60796 | A | 3/2007 | |
| JP | 2007-135355 | A | 5/2007 | |
| JP | 2008-236821 | A | 10/2008 | |
| JP | 2009-79559 | A | 4/2009 | |
| WO | WO 2008/058284 | A2 | 5/2008 | |
| WO | WO 2010/063913 | A2 | 6/2010 | |
| WO | WO 2011/016273 | A1 | 2/2011 | |
| WO | WO 2011/090511 | A2 | 7/2011 | |

OTHER PUBLICATIONS

He, Guang S., et al. "Optical power limiting and stabilization based on a novel polymer compound." IEEE journal of quantum electronics 34.12 (1998): pp. 2279-2285.*

Arai, Junichi, et al. "Power electronics and its applications to renewable energy in Japan." IEEE circuits and systems Magazine 8.3 (2008): pp. 52-66.*

International Search Report dated Dec. 13, 2011 w/ English translation (four (4) pages).

Japanese Office Action dated Jun. 16, 2015 (five pages).

Extended European Search Report issued in counterpart European Application No. 11871811.3 dated Sep. 2, 2015 (Eight (8) pages).

\* cited by examiner

SYSTEM STABILIZATION SYSTEM

TECHNICAL FIELD

The present invention relates to a system stabilization system for stabilizing a power system.

BACKGROUND ART

At present, efforts are being promoted to increase the use of renewable energy, such as solar power generation and wind power generation, with a view towards countering global warming and ensuring security as it relates to energy use. However, with solar power generation and wind power generation, power is generated irrespective of power demand, and, in addition, the amount of power generated fluctuates. Thus, when renewable sources of energy such as these are integrated into a power system, measures must be taken to stabilize the power system as a whole.

Basically, the technique for stabilizing a power system involves connecting to the power system power storage equipment that is capable of charging and discharging, taking power from the power system to charge the power storage equipment when there is an increase in power system power, and discharging power from the power storage equipment to the power system when there is a drop in power. Specifically, for example, Patent Literature 1 discloses a system for suppressing fluctuations effectively and at low cost by using a combination of a power storage apparatus for smoothing medium- and long-term components of power fluctuations and a capacitor for absorbing short-term components of power fluctuations.

CITATION LIST

Patent Literature

[PTL 1]
Japanese Patent Application Laid-open No. 2007-135355

SUMMARY OF INVENTION

Technical Problem

Generally speaking, a power storage apparatus, such as a lead-acid storage battery, is used as the power storage equipment in a system stabilization system. A lead-acid storage battery or other such power storage apparatus deteriorates as a result of repeated charging and discharging, and the amount of electric power energy this power storage apparatus is capable of storing declines. When the power storage apparatus in a system stabilization system deteriorates, the system stabilization system is no longer able to carry out its original function, and as such, curbing the deterioration of the power storage apparatus prolongs the life of the system stabilization system.

However, the system disclosed in Patent Literature 1 delays the response of the power storage apparatus in accordance with a lag-time constant so as to successfully track the medium- and long-term components of power fluctuations without trying to reduce the number of times the power storage apparatus charges and discharges, and as a result is unable to appropriately adjust and control the mutual relationship between the charging and discharging of the power storage apparatus and the capacitor so as to reduce the number of times the power storage apparatus is charged and discharged. Therefore, there is the likelihood that numerous repeated charging and discharging of the power storage apparatus will result in early deterioration.

An object of the present invention is to prolong the life of a system stabilization system that makes combined use of a power storage apparatus and a capacitor.

Solution to Problem

A system stabilization system according to one embodiment of the present invention is for suppressing power fluctuations in a power system, and comprises a power storage apparatus configured to suppress power fluctuations in the power system by charging or discharging in response to a control, a capacitor apparatus configured to suppress power fluctuations in the power system by making the charge/discharge response to the control faster than the power storage apparatus and charging or discharging in response to the control, and a control apparatus for controlling the power storage apparatus and the capacitor apparatus so as to at least suppress the number of times that either charging or discharging occurs in the power storage apparatus.

The control apparatus may start either charging or discharging the capacitor apparatus when a power fluctuation has been detected in the power system, and may start either charging or discharging the power storage apparatus when the power fluctuation in the power system is detected continuously in excess of a prescribed short-term fluctuation period.

The capacitor apparatus may have a capacitance that makes it possible to absorb the power fluctuations in the power system until the power storage apparatus, which has started either charging or discharging after the elapse of the short-term fluctuation period, is able to suppress the power fluctuation in the power system.

The short-term fluctuation period may be decided on the basis of the fluctuation characteristics of the power generated by a power generation apparatus that produces the power fluctuations in the power system.

The system stabilization system may further comprise a frequency detector for detecting the frequency of the power system, and the control apparatus may compare the frequency detected by the frequency detector with a prescribed frequency threshold, and may detect the power fluctuations in the power system when the frequency reaches the frequency threshold, and start either charging or discharging the capacitor apparatus.

The control apparatus may start either charging or discharging the capacitor apparatus when a power fluctuation has been detected in the power system, and may start either charging or discharging the power storage apparatus when the state-of-charge in the capacitor apparatus reaches a prescribed charge threshold.

The control apparatus may start either charging or discharging the capacitor apparatus when a power fluctuation has been detected in the power system, and may start either charging or discharging the power storage apparatus when a time period until the state-of-charge in the capacitor apparatus reaches the prescribed charge threshold is equal to or less than the time period until the power either to be charged to or discharged from the power storage apparatus when either the charging or discharging of the power storage apparatus has started reaches an amount of power capable of suppressing the power fluctuations in the power system.

The power storage apparatus may comprise a plurality of storage batteries, and the control apparatus may measure the number of charges/discharges for each of the plurality of storage batteries, regard a storage battery performing the smallest number of charges/discharges as a system fluctuation suppressing storage battery for suppressing power fluctuations in the power system, regard the remaining storage battery as a load use offset storage battery for offsetting the use of power in the power system as a result of the load, charge the load use offset storage battery during a period when a small amount of power is being used as a result of the load, and discharge the load use offset storage battery during a period when a large amount of power is being used as a result of the load.

The capacitor apparatus may comprise a lithium ion capacitor, and may be an apparatus for charging and discharging the lithium ion capacitor.

DESCRIPTION OF EMBODIMENTS

The embodiment of the present invention will be explained by referring to the drawings.

Figure 1:
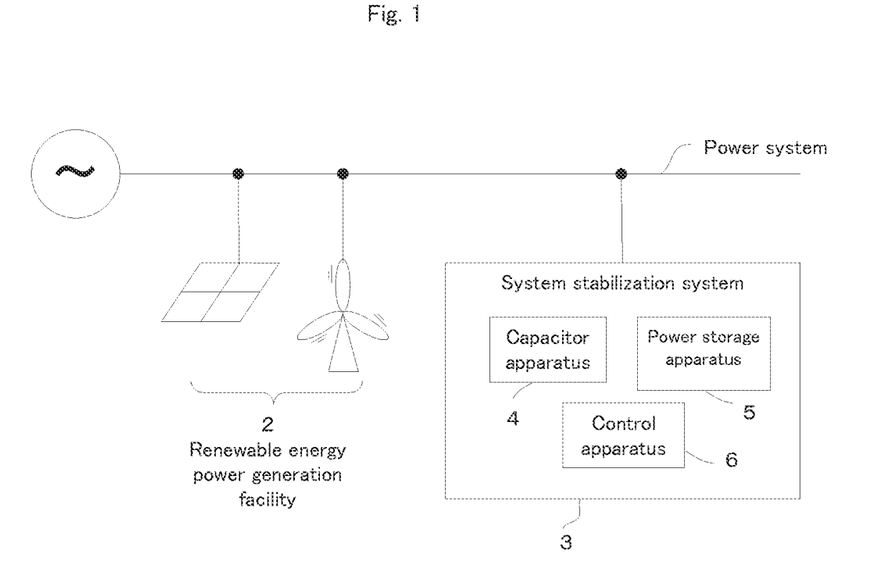
FIG. 1 is a block diagram showing the basic configuration of a system stabilization system of an embodiment of the present invention.

FIG. 1 is a block diagram showing the basic configuration of a system stabilization system of the embodiment of the present invention.

The system stabilization system 3 of this embodiment is connected to a power system 1 to which a renewable energy power generation facility 2 is connected, and is for suppressing power fluctuations in the power system 1. The power system 1, in addition to power from the renewable energy power generation facility 2, may also use power from an exhaustible energy power generation facility not shown in the drawing, such as a hydroelectric power plant, a thermal power plant, a nuclear power plant and so forth. Furthermore, the load from household electrical appliances and the like is connected to a commercial power supply that is supplied with power from the power system 1, and consumes power.

Referring to FIG. 1, the system stabilization system 3 comprises a capacitor apparatus 4, a power storage apparatus 5, and a control apparatus 6.

The power storage apparatus 5, by way of example, is provided with a lead-acid storage battery or other such storage battery, and is an apparatus for suppressing power fluctuations in the power system 1 by either charging the storage battery with power from the power system 1 or discharging the storage battery to the power system 1. The charging and discharging of the power storage apparatus 5 is controlled by the control apparatus 6.

The capacitor apparatus 4, by way of example, is provided with a lithium ion capacitor, and is an apparatus for absorbing and suppressing power fluctuations in the power system 1 by either charging the lithium ion capacitor with power from the power system 1 or discharging the lithium ion capacitor to the power system 1. The charging and discharging of the capacitor apparatus 4 is controlled by the control apparatus 6.

The control apparatus 6 controls the charging and discharging of the power storage apparatus 5 and the capacitor apparatus 4 so as to suppress power fluctuations in the power system 1. In so doing, the control apparatus 6 adjusts the mutual relationship between the charging and discharging of the power storage apparatus 5 and the capacitor apparatus 4, such as the charge/discharge start times of the power storage apparatus 5 and the capacitor apparatus 4 so as to suppress the number of times that either charging or discharging occurs in the power storage apparatus 5. According to the embodiment, control is performed as appropriate to adjust the charging and discharging of both the power storage apparatus 5 and the capacitor apparatus 4, and to reduce the number of times that the power storage apparatus 5 charges and discharges, thereby making it possible to suppress the deterioration of the power storage apparatus 5 and to prolong the life of the system stabilization system 3. Also, since the lithium ion capacitor is much safer and can readily achieve higher capacity than a conventional capacitor, it is ideal for large-scale systems for which reliability is imperative, such as the system for stabilizing the power system 1.

For example, the control apparatus 6 first starts either the charging or the discharging of the capacitor apparatus 4 when a power fluctuation is detected in the power system 1, and when the power continues to fluctuate in excess of a prescribed short-term fluctuation period, starts either the charging or the discharging of the power storage apparatus 5. This makes it possible to carry out control so as to suppress the power fluctuation within the short-term fluctuation period using only the capacitor apparatus 4 without the power storage apparatus 5 being either charged or discharged. The renewable energy power generation facility 2 tends to be susceptible to short-term fluctuations in output. According to the embodiment, the power storage apparatus 5 neither charges nor discharges when power fluctuates within a short-term fluctuation period like this, thereby enabling the number of power storage apparatus 5 charges and discharges to be reduced.

When the main cause of a power fluctuation in the power system 1 is a change in the output of the renewable energy power generation facility 2, it is preferable that the short-term fluctuation period be set in accordance with the characteristics of the fluctuation in the output of the renewable energy power generation facility 2. The characteristics of the fluctuation in the output of the renewable energy power generation facility 2 can be acquired by keeping statistics. In order to use the capacitor apparatus 4 to absorb a short-term fluctuation, the approximate length of time a power fluctuation is apt to occur as a short-term fluctuation caused by the renewable energy power generation facility 2 should be taken into consideration, and the short-term fluctuation period should be set equal to or longer than this time. The capacitor apparatus 4 should have enough capacitance to be able to absorb a power fluctuation in the power system 1 that is within the short-term fluctuation period. In accordance therewith, the capacitor apparatus 4 is provided with enough capacitance to be able to absorb a power fluctuation for the short period of time inferred for the renewable energy power generation facility 2, and control is carried out so that the short-term power fluctuation is absorbed using only the capacitor apparatus 4 without a charge/discharge occurring in the power storage apparatus 5, thereby making it possible to appropriately suppress a power fluctuation relative to the renewable energy power generation facility 2 that is being used.

As one example of a power fluctuation determination, a first power threshold that is higher than a desired power value at which the power system 1 power should be maintained, and a second power threshold that is lower than the desired power value are set, and when the power value of the power system 1 exceeds the first power threshold, or when the power value of the power system 1 falls below the second power threshold, a determination may be made that the power has fluctuated in the power system 1. When the power system 1 power has exceeded the first power threshold, the power is rising, and as such, a charge from the power system 1 to the capacitor apparatus 4 may be started. When the power system 1 power has fallen below the second power threshold, the power is dropping, and as such, a discharge from the capacitor apparatus 4 to the power system 1 may be started.

Alternatively, since the frequency will fluctuate as a result of a power fluctuation in the power system 1, another example of a power fluctuation determination is to set a first frequency threshold that is higher than a desired frequency value of the power system 1, and a second frequency threshold that is lower than the desired frequency value, and when the frequency value of the power system 1 exceeds the first frequency threshold, or when the frequency value of the power system 1 falls below the second frequency threshold, a determination may be made that the power has fluctuated in the power system 1. When the frequency value of the power system 1 has exceeded the first frequency threshold, the power is rising, and as such, a charge from the power system 1 to the capacitor apparatus 4 may be started. When the frequency value of the power system 1 has fallen below the second frequency threshold, the power is dropping, and as such, a discharge from the capacitor apparatus 4 to the power system 1 may be started.

When a power fluctuation is detected in the power system 1, the control apparatus 6 may start either charging or discharging the capacitor apparatus 4, and when the charge of the capacitor apparatus 4 reaches a prescribed charge threshold, may start either charging or discharging the power storage apparatus 5. In this case, there is no need to set a short-term fluctuation period. It is preferable that the capacitance of the capacitor apparatus 4 be set in accordance with the characteristics of output fluctuation in the renewable energy power generation facility 2. To absorb a short-term fluctuation using the capacitor apparatus 4, an assumption should be made as to how much of a temporal change in power corresponding to the charge will occur as a short-term fluctuation (a temporary fluctuation for a short period) caused by the renewable energy power generation facility 2, and the capacitance of the capacitor apparatus 4 should be set to equal to or greater than this charge. According to this example, a power fluctuation capable of being absorbed by the capacitor apparatus 4 is absorbed by the capacitor apparatus 4, thereby making it possible to reduce to the extent possible the number of times the power storage apparatus 5 charges and discharges by using the capacitance of the capacitor apparatus 4 as a limit. Also, since the capacitor apparatus 4 is provided with enough capacitance to be able to absorb an assumed short-term power fluctuation by the renewable energy power generation facility 2, a power fluctuation capable of being absorbed by the capacitor apparatus 4 is absorbed by the capacitor apparatus 4, thereby making it possible to appropriately suppress a power fluctuation relative to the renewable energy power generation facility 2 that is being used.

The control apparatus 6 first may start either the charging or the discharging of the capacitor apparatus 4 when a power fluctuation is detected in the power system 1, and when the power fluctuation continues in excess of a prescribed short-term fluctuation period, may start either the charging or the discharging of the power storage apparatus 5, and, in addition, may also start either charging or discharging the power storage apparatus 5 even when the charge in the capacitor apparatus 4 has reached a prescribed charge threshold (either an upper limit or a lower limit) prior to the power fluctuation in the power system 1 having exceeded the short-term fluctuation period.

The practical example will be explained in more detail hereinbelow.

Example 1

Figure 2:
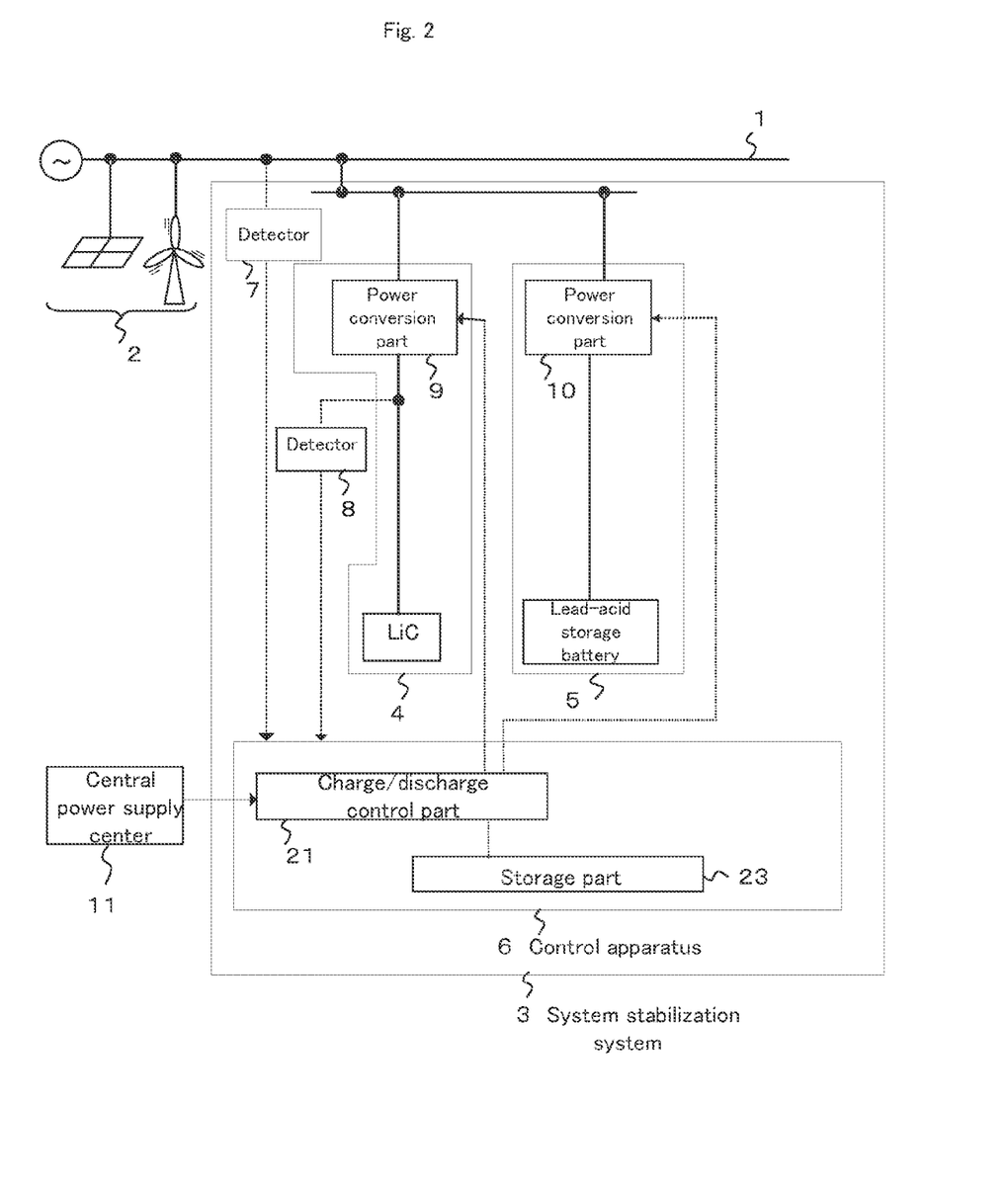
FIG. 2 is a block diagram showing the configuration of the system stabilization system of a first practical example.

FIG. 2 is a block diagram showing the configuration of a system stabilization system of a first practical example.

The system stabilization system 3 according to this practical example comprises a capacitor apparatus 4, a power storage apparatus 5, a control apparatus 6, a frequency detector 7, and a power detector 8. The capacitor apparatus 4 comprises a lithium ion capacitor 11 and a power conversion part 9. The power storage apparatus 5 comprises a lead-acid storage battery 12 and a power conversion part 10. The control apparatus 6 comprises a charge/discharge control part 21 and a storage part 23.

The system stabilization system 3 is either directly or indirectly connected to the transmission route of the power system 1 that supplies power generated by a renewable energy power generation facility such as solar power and/or wind power.

The frequency detector 7 is connected to the power system 1. The frequency detector 7 acquires the status (measures the frequency) of the power system 1 and notifies the control apparatus 6. The result acquired by the frequency detector 7 is used by the control apparatus 6 in charge/discharge control for allowing power to flow between the system stabilization system 3 and the power system 1. Charge/discharge control includes control of the voltage, frequency, and phase-matching for the power conversion part 9.

The power conversion parts 9 and 10 are connected to the power system 1. The power conversion part 9 matches the power input/output to/from the power system 1 with the charge/discharge power of the lithium ion capacitor 11 by converting the power on the basis of the control from the charge/discharge control part 21. The power conversion part 10 matches the power input/output to/from the power system 1 with the charge/discharge power of the lead-acid storage battery 12 by converting the power on the basis of the control from the charge/discharge control part 21.

The lithium ion capacitor 11 is either charged with power from the power system 1 by way of the power conversion part 9 or discharges power to the power system 1 by way of the power conversion part 9.

The lead-acid storage battery 12 is either charged with power from the power system 1 by way of the power conversion part 10 or discharges power to the power system 1 by way of the power conversion part 10.

The power detector 8 detects the power output of the power conversion part 9, and sends the detection result to the control apparatus 6.

Figure 3:
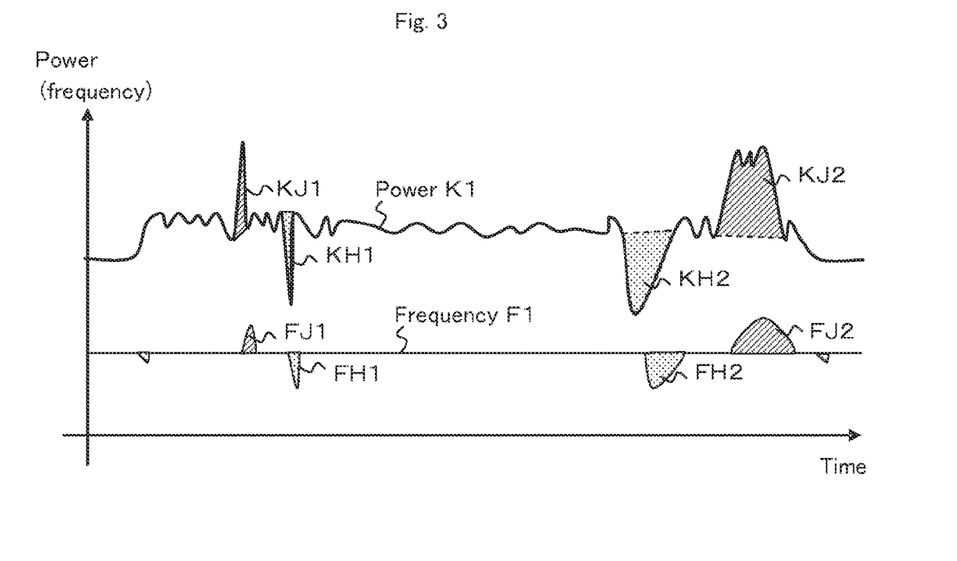
FIG. 3 is a drawing illustrating the states of short-term fluctuations in a power system 1.

FIG. 3 is a drawing illustrating a short-term fluctuation in the power system 1.

Sudden power fluctuations KJ1, KJ2, KH1, and KH2 may occur over a short period of time in the power K1 of the power system 1 as a result of the power being generated by the renewable energy power generation facility 2. At this time, the frequency of the power system 1 may also be subject to the affects of the fluctuations in power, and may fluctuate at equal to or higher than an acceptable level. In FIG. 3, fluctuations FJ1, FJ2, FH1, and FH2 occur in the frequency F1 of the power system 1.

Short-term fluctuations like this must be suppressed in order to stabilize the power system 1. In this practical example, when the frequency suddenly rises as in the frequency fluctuations FJ1 and FJ2, the rises in the frequency F1 are suppressed by first draining power from the power system 1 and charging the lithium ion capacitor 11, and, as needed, also charging the lead-acid storage battery 12. When the frequency suddenly drops as in the frequency fluctuations FH1 and FH2, the drops in the frequency F1 are suppressed by first discharging power from the lithium ion capacitor 11 to the power system 1 and, as needed, also discharging power from the lead-acid storage battery 12 to the power system 1.

The control for suppressing the short-term fluctuations is performed by the charge/discharge control part 21. Furthermore, the charging and discharging of the lithium ion capacitor 11 and the lead-acid storage battery 12 are not limited solely to suppressing short-term fluctuations, but rather can be used widely in fluctuation suppression situations for stabilizing the power system 1.

The charge/discharge control part 21 compares the power system 1 frequency notified from the frequency detector 7 to a preset frequency upper limit value and lower limit value. The acceptable fluctuation range for the frequency lies between the upper limit value and the lower limit value. When the power system 1 frequency is equal to or higher than the upper limit value, the charge/discharge control part 21 starts the charging of power from the power system 1 to the lithium ion capacitor 11 and records the charge start time in the storage part 23. When the power system 1 frequency is equal to or less than the lower limit value, the charge/discharge control part 21 starts the discharging of power from the lithium ion capacitor 11 to the power system 1 and records the discharge start time in the storage part 23.

The charge/discharge control part 21 discontinues either the charging of power to the lithium ion capacitor 11 or the discharging of power from the lithium ion capacitor 11 when the power system 1 frequency detected by the frequency detector 7 has returned to within the acceptable fluctuation range.

The charge/discharge control part 21 starts either the charging or the discharging of the lead-acid storage battery 12 when a prescribed period of time TB (the short-term fluctuation period) has elapsed before the power system 1 frequency detected by the frequency detector 7 has returned to within the acceptable range.

Figure 4:
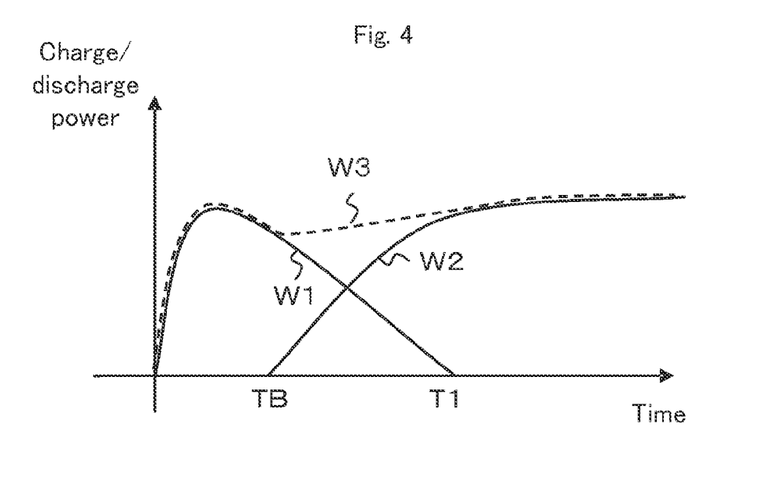
FIG. 4 is a graph showing the relationship between input/output power of a power conversion part 9 for a lithium ion capacitor 11 and the input/output power of a power conversion part 10 for a lead-acid storage battery 12.

FIG. 4 is a graph showing the relationship between the power input/output by the power conversion part 9 for the lithium ion capacitor 11 and the power input/output by the power conversion part 10 for the lead-acid storage battery 12.

A curved line W1 indicates the charge/discharge power of the lithium ion capacitor 11, a curved line W2 indicates the charge/discharge power of the lead-acid storage battery 12, and a curved line W3 indicates the total power of the charge/discharge power of the lithium ion capacitor 11 and the lead-acid storage battery 12.

The charge/discharge control part 21 first starts the charging/discharging of the lithium ion capacitor 11, and starts the charging/discharging of the lead-acid storage battery 12 thereafter. In so doing, the charge/discharge control part 21 starts the charging/discharging of the lead-acid storage battery 12 such that the power that is either being charged to or discharged from the lead-acid storage battery 12 constitutes a power value that is capable of suppressing either an increase or a decrease in power in the power system 1 until a time T1 when the capacitance of the capacitor apparatus 4 has been exceeded and the charging/discharging of the power storage apparatus 5 is required. The start time of the lead-acid storage battery 12 charge/discharge is TB.

The charge/discharge control part 21 starts either the charging or the discharging of the lead-acid storage battery 12 when the charge in the lithium ion capacitor 11 has reached either the upper limit or the lower limit prior to the time TB having elapsed after starting either the charging or the discharging of the lithium ion capacitor 11. In this practical example, the upper limit and the lower limit constitute charge thresholds.

According to this practical example, when the power fluctuations in the power system 1 are suppressed, that is, when the frequency returns to the acceptable range prior to starting the charging/discharging of the lead-acid storage battery 12, the charging/discharging of the lead-acid storage battery 12 is not performed, thereby reducing the number of charges/discharges of the lead-acid storage battery 12 and prolonging the life of the lead-acid storage battery more than in a power storage system comprising only a lead-acid storage battery 12. The lithium ion capacitor 11 can be charged/discharged tens of thousands of times whereas the lead-acid storage battery 12 can only be charged/discharged between several hundred to several thousand times, therefore making it possible to prolong the life of the system stabilization system 3 by carrying out control such that the number of charges/discharges of the lead-acid storage battery 12 are fewer than the number of charges/discharges of the lithium ion capacitor 11.

Figure 5:
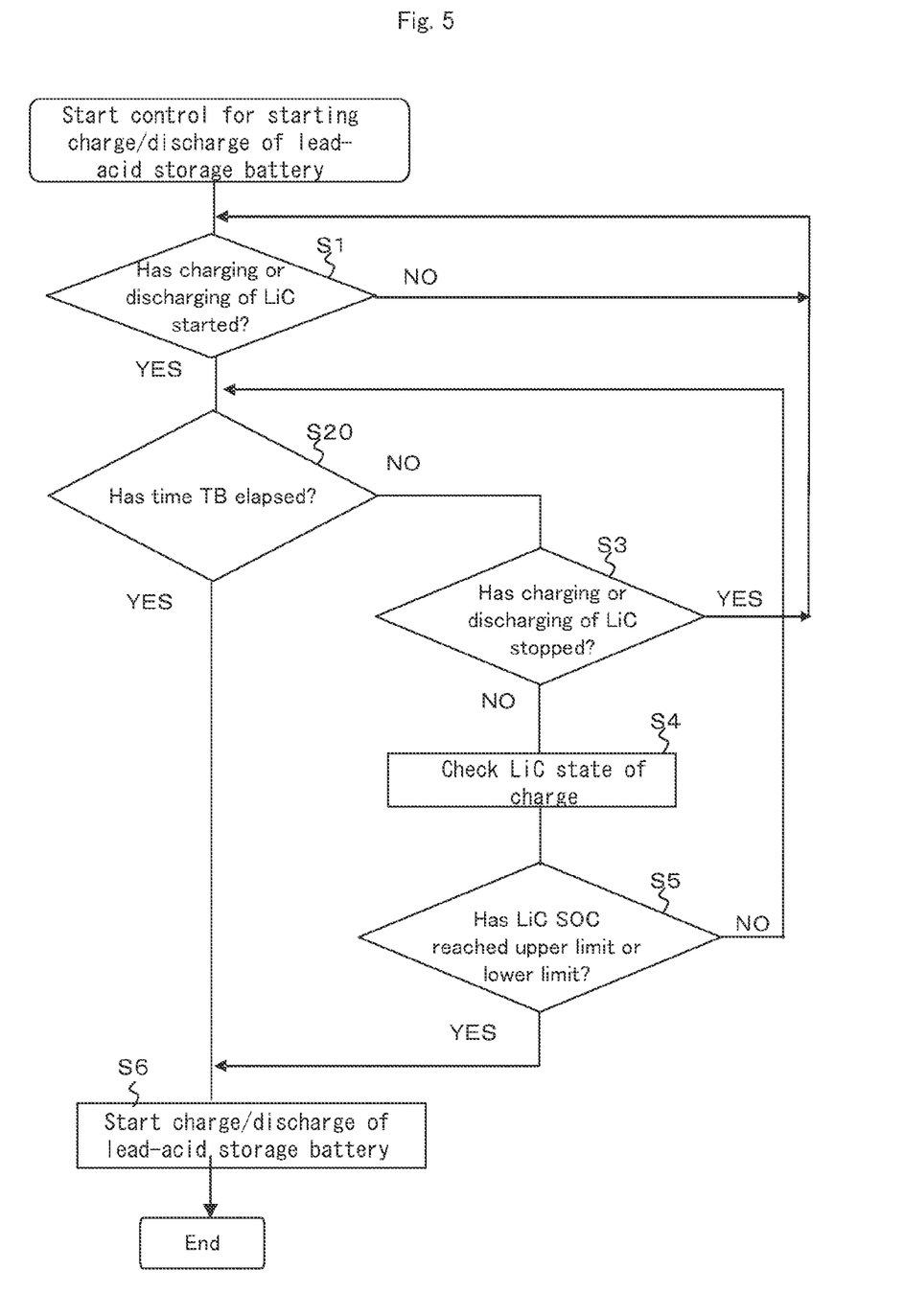
FIG. 5 is an example of a flowchart for controlling the time at which the charge/discharge control part 21 starts charging/discharging the lead-acid storage battery 12 in the first practical example.

FIG. 5 is an example of a flowchart for controlling the time at which the charge/discharge control part 21 starts the charging/discharging of the lead-acid storage battery 12 in the first practical example.

First of all, in Step S1, the charge/discharge control part 21 determines whether or not either the charging or discharging of the lithium ion capacitor (LiC) 11 has started. Since a status indicating that either charging or discharging has started is stored in the storage part 23 when starting either the charging or discharging of the lithium ion capacitor 11, the charge/discharge control part 21 can determine that either charging or discharging has started by reading the status from the storage part 23.

The charge-discharge control part 21 proceeds to Step S20 when either the charging or the discharging of the lithium ion capacitor 11 has started, and proceeds to Step S1 when the charging/discharging of the lithium ion capacitor 11 has not started.

In Step S20, the charge/discharge control part 21 determines whether or not the elapsed time since either the charging or discharging of the lithium ion capacitor 11 started has exceeded a preset time TB. The time TB, for example, may be notified to the charge/discharge control part 21 of the system stabilization system 3 from a central power supply center 13 that supervises power supply facilities, and the charge/discharge control part 21 may store the time TB in the storage part 23.

The charge/discharge control part 21 proceeds to Step S6 when the time TB has elapsed since the start of either the charging or discharging of the lithium ion capacitor 11, and proceeds to Step S3 when the time TB has not elapsed since the start of either the charging or discharging of the lithium ion capacitor 11.

In Step S6, the charge/discharge control part 21 starts either the charging or the discharging of the lead-acid storage battery 12.

In Step S3, the charge/discharge control part 21 determines whether either the charging or discharging of the lithium ion capacitor 11 has stopped. The charge/discharge control part 21 proceeds to Step S1 when the charging/discharging of the lithium ion capacitor 11 has stopped, and proceeds to Step S4 when the charging/discharging of the lithium ion capacitor 11 has not stopped.

In Step S4, the charge/discharge control part 21 measures the voltage of the lithium ion capacitor 11 in accordance with the power detector 8, calculates the amount of electric power energy stored in the lithium ion capacitor 11 (the state-of-charge: SOC), and proceeds to Step S5. As a method for measuring the state-of-charge of the lithium ion capacitor 11, the charge/discharge control part 21 may calculate the amount of power that has flowed to the lithium ion capacitor 11 as detected by the power detector 8, or either the lithium ion capacitor 11 or the power conversion part 9 may measure the state-of-charge and notify the charge/discharge control part 21 thereof.

In Step S5, the charge/discharge control part 21 determines whether the state-of-charge of the lithium ion capacitor 11 has reached either the charge upper limit value or lower limit value of the lithium ion capacitor 11. As used here, the upper limit value is the charge upper limit up to which the lithium ion capacitor 11 is capable of being charged, and the lower limit value is the charge lower limit down to which the lithium ion capacitor 11 is capable of being discharged.

The charge/discharge control part 21 starts the charging/discharging of the lead-acid storage battery 12 when the state-of-charge of the lithium ion capacitor 11 has reached either the upper limit value or the lower limit value, and proceeds to Step S20 when neither the upper limit value nor the lower limit value has been reached.

Example 2

The configuration of the system stabilization system 3 of a second practical example is the same as that of the first practical example shown in FIG. 2. However, in the second practical example, the operation of the charge/discharge control part 21 differs from that of the first practical example. In the second practical example, the charge/discharge control part 21 starts either the charging or the discharging of the lead-acid storage battery 12 when the state-of-charge of the lithium ion capacitor 11 reaches either an upper or lower setpoint. In this practical example, either the upper or lower setpoint constitute the charge threshold.

Figure 6:
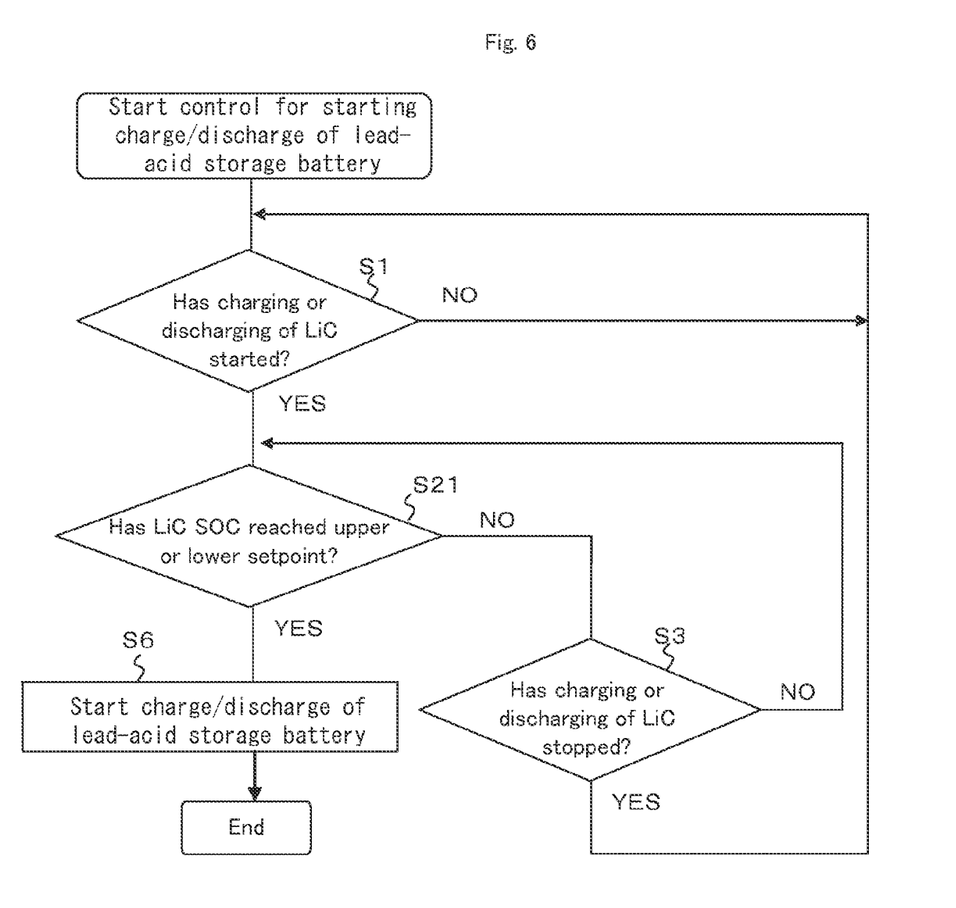
FIG. 6 is an example of a flowchart for controlling the time at which the charge/discharge control part 21 starts charging/discharging the lead-acid storage battery 12 in a second practical example.

FIG. 6 is an example of a flowchart for controlling the time at which the charge/discharge control part 21 starts a charge/discharge of the lead-acid storage battery 12 in the second practical example.

First of all, in Step S1, the charge/discharge control part 21 determines whether or not either the charging or the discharging of the lithium ion capacitor 11 has started.

The charge/discharge control part 21 proceeds to Step S21 when either the charging or the discharging of the lithium ion capacitor 11 has started, and proceeds to Step S1 when either the charging or the discharging of the lithium ion capacitor 11 has not started.

In Step S21, the charge/discharge control part 21 determines whether or not the state-of-charge of the lithium ion capacitor 11 has reached the preset either upper or lower setpoint. The set points may, for example, be notified to the charge/discharge control part 21 from the central power supply center 13, or the charge/discharge control part 21 may store the set points in the storage part 23 beforehand.

The charge/discharge control part 21 proceeds to Step S6 when the state-of-charge of the lithium ion capacitor 11 has reached either the upper or the lower setpoint, and proceeds to Step S3 when the state-of-charge has not reached either the upper or the lower setpoint.

In Step S6, the charge/discharge control part 21 starts either the charging or the discharging of the lead-acid storage battery 12.

In Step S3, the charge/discharge control part 21 determines whether or not the lithium ion capacitor 11 has stopped being either charged or discharged. The charge/discharge control part 21 proceeds to Step S1 when either the charging or the discharging of the lithium ion capacitor 11 has stopped, and proceeds to Step S21 when either the charging or the discharging of the lithium ion capacitor 11 has not stopped.

Example 3

The configuration of the system stabilization system 3 of a third practical example is the same as that of the first practical example shown in FIG. 2. However, in the third practical example, the operation of the charge/discharge control part 21 differs from that of the first practical example. In the third practical example, when the state-of-charge of the lithium ion capacitor 11 reaches either an upper limit value or a lower limit value, the charge/discharge control part 21 starts either the charging or the discharging of the lead-acid storage battery 12 so that the power for charging/discharging the lead-acid storage battery 12 reaches an amount of power capable of suppressing a power fluctuation in the power system 1. In this practical example, the upper limit value and the lower limit value constitute the charge thresholds. That is, the charge/discharge control part 21 starts either the charging or the discharging of the lead-acid storage battery 12 when a time period until the state-of-charge of the lithium ion capacitor 11 reaches the charge threshold is equal to or less than the time period until the power that is either being charged or discharged when the charging or discharging of the lead-acid storage battery 12 has started reaches an amount of power capable of suppressing a fluctuation in the power of the power system 1.

The value of the power capable of suppressing a power fluctuation in the power system 1 may be a preset power value, or may be calculated from a measured value of the power of the power system 1. The power value can be inferred during a fluctuation in the power system 1 from the power generation characteristics of the renewable energy power generation facility 2. Either a peak value or an average value of the power may be determined statistically when a fluctuation is occurring in the power system 1, and the amount of fluctuation from the desired power may be set as the power value capable of suppressing a power fluctuation in the power system 1. Or, the power of the power system 1 during a fluctuation may be measured, an average value, a peak value, or a latest value of the power during the fluctuation may be determined, and the amount of fluctuation from the desired power may be set as the amount of power capable of suppressing a power fluctuation in the power system 1.

Figure 7:
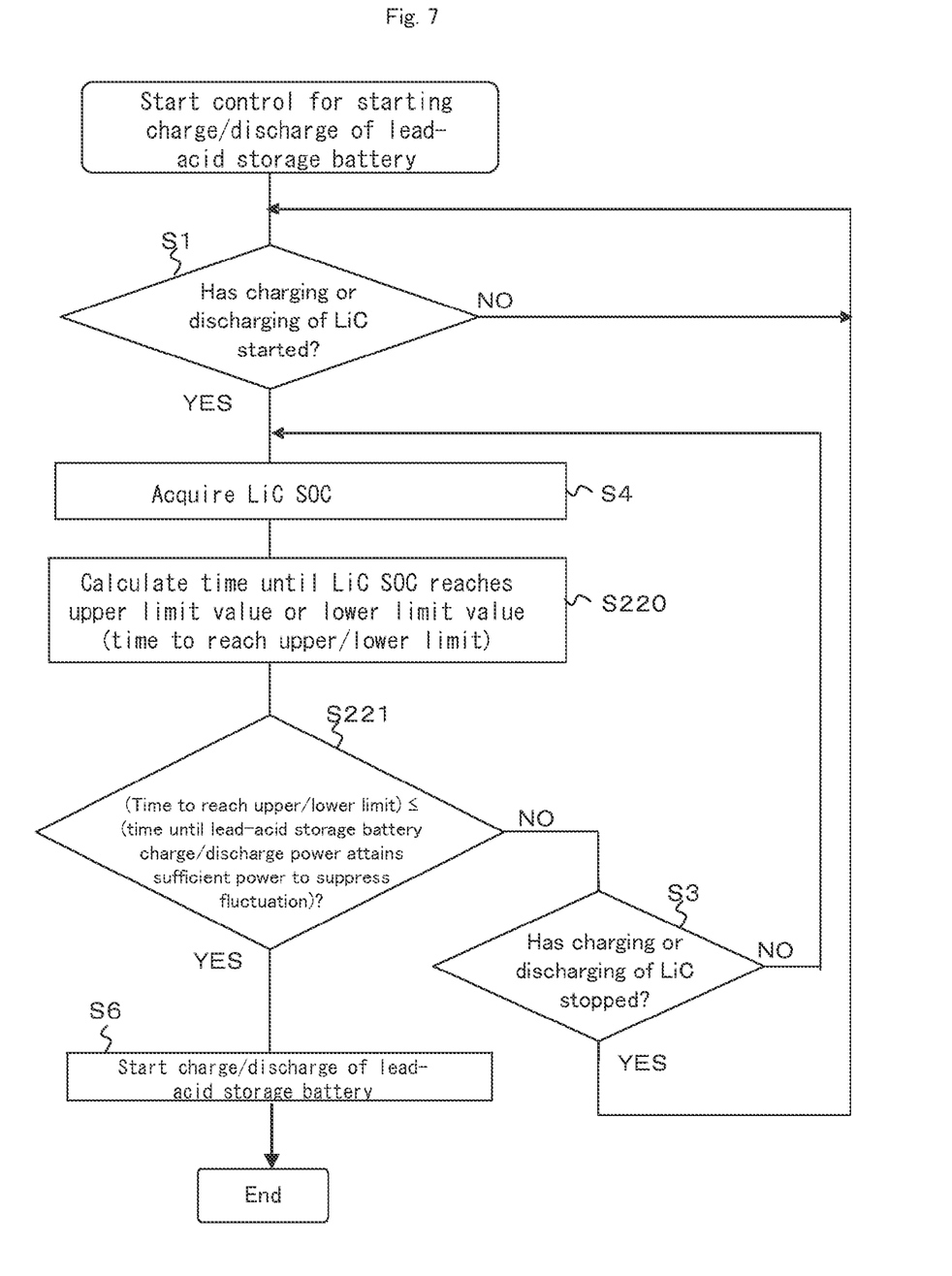
FIG. 7 is an example of a flowchart for controlling the time at which the charge/discharge control part 21 starts charging/discharging the lead-acid storage battery 12 in a third practical example.

FIG. 7 is an example of a flowchart for controlling the time at which the charge/discharge control part 21 starts a charge/discharge of the lead-acid storage battery 12 in a third practical example.

First of all, in Step S1, the charge/discharge control part 21 determines whether or not the charging or discharging of the lithium ion capacitor 11 has started.

The charge/discharge control part 21 proceeds to Step S4 when either the charging or the discharging of the lithium ion capacitor 11 has started, and proceeds to Step S1 when either the charging or the discharging of the lithium ion capacitor 11 has not started.

In Step S4, the charge/discharge control part 21 uses the lithium ion capacitor 11 voltage measured by the power detector 8 to compute the state-of-charge (SOC) of the lithium ion capacitor 11, and proceeds to Step S220.

In Step S220, the charge/discharge control part 21 calculates the time until the state-of-charge of the lithium ion capacitor 11 reaches either the preset upper limit value or lower limit value (time to reach capacitor upper/lower limit value) TL on the basis of the lithium ion capacitor 11 state-of-charge calculated in Step S4 and a lithium ion capacitor 11 charge/discharge power value detected by the power detector 8, and proceeds to Step S221.

For example, on the basis of the calculated state-of-charge and the lithium ion capacitor 11 charge/discharge power value, the charge/discharge control part 21 may determine an approximation function for approximating the change in the state-of-charge of the lithium ion capacitor 11, and based on this approximation function, may calculate the time until the state-of-charge reaches either the upper limit value or the lower limit value. For example, when the power being charged or discharged by the lithium ion capacitor 11 is fixed, a change in the state-of-charge can be approximated using a linear function.

In Step S221, the charge/discharge control part 21 compares the time to reach capacitor upper/lower limit value TL calculated in Step S220 to the time until the power in the lead-acid storage battery 12 is capable of suppressing a power fluctuation in the power system 1 (storage battery build-up time).

The charge/discharge control part 21 starts either the charging or the discharging of the lead-acid storage battery 12 when the time to reach upper/lower limit value TL is equal to or less than the storage battery build-up time, and proceeds to Step S3 when the time to reach upper/lower limit value TL is not equal to or less than the storage battery build-up time.

In Step S3, the charge/discharge control part 21 determines whether or not the charging/discharging of the lithium ion capacitor 11 has stopped. The charge/discharge control part 21 proceeds to Step S1 when the charging/discharging of the lithium ion capacitor 11 has stopped, and proceeds to Step S4 when the charging/discharging of the lithium ion capacitor 11 has not stopped.

Example 4

The configurations and operation of the power storage apparatus 5 and the control apparatus 6 of a system stabilization system of a fourth practical example differ from those of the first practical example shown in FIG. 2. In this practical example, there is a plurality of lead-acid storage batteries, and this plurality of lead-acid batteries is used for different purposes, i.e., storage batteries for the purpose of suppressing a power fluctuation in the power system 1 the same as in the practical examples described hereinabove (system fluctuation suppressing storage batteries) and storage batteries for the purpose of storing power to offset power consumption due to load (load use offsetting storage batteries).

Figure 8:
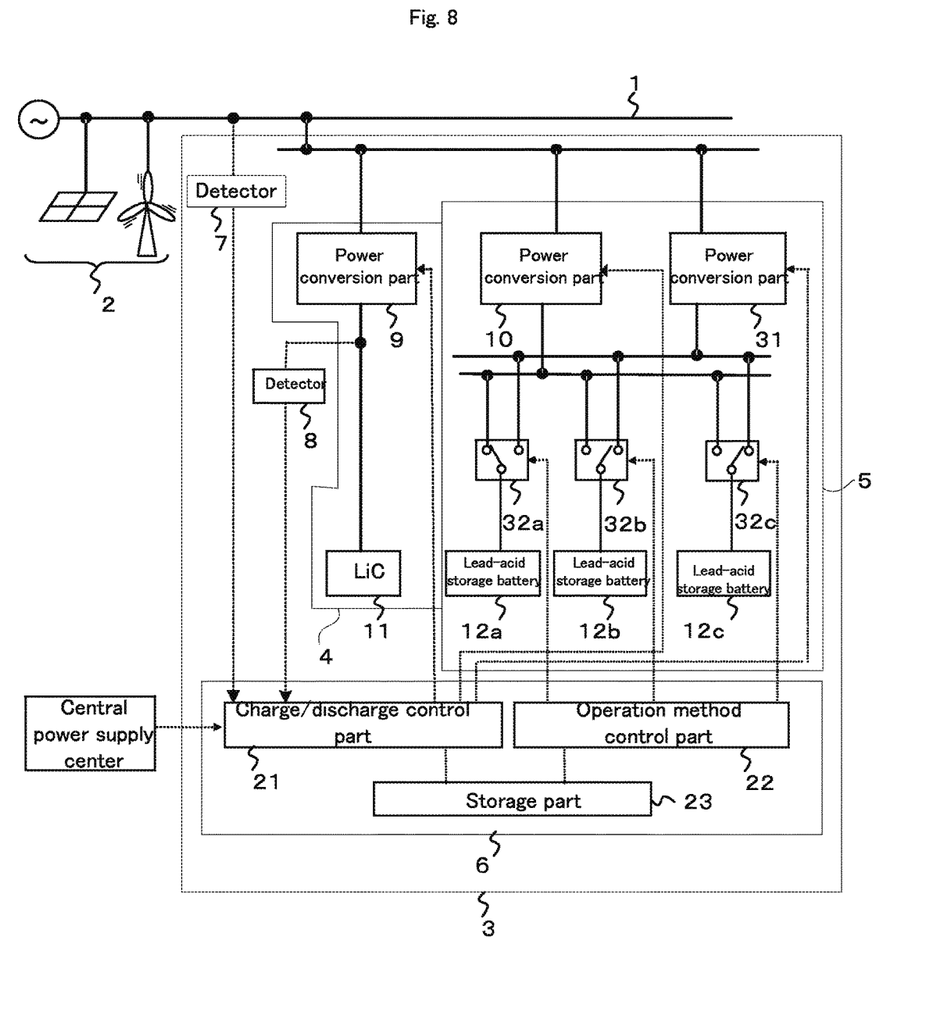
FIG. 8 is a block diagram showing the configuration of a system stabilization system of a fourth practical example.

FIG. 8 is a block diagram showing the configuration of the system stabilization system of the fourth practical example.

The system stabilization system 3 according to the fourth practical example comprises a capacitor apparatus 4, a power storage apparatus 5, a control apparatus 6, a frequency detector 7, and a power detector 8. The capacitor apparatus 4 comprises a lithium ion capacitor 11 and a power conversion part 9. The power storage apparatus 5 comprises lead-acid storage batteries 12a through 12c, switches 32a through 32c, and power conversion parts 10 and 31. The control apparatus 6 comprises a charge/discharge control part 21, an operation method control part 22, and a storage part 23.

As described above, in the system stabilization system 3 according to this practical example, the power storage apparatus 5 has two power conversion parts 10 and 31, and three lead-acid storage batteries 12a through 12c. The lead-acid storage batteries 12a through 12c are respectively connected to the switches 32a through 32c. The power conversion parts 10 and 31 are connected to the power system 1. The power conversion part 10 is used for charging/discharging the lead-acid batteries for suppressing a power fluctuation in the power system 1. The power conversion part 31 is used for charging/discharging the lead-acid storage batteries for storing power and offsetting power consumption due to load.

Switching the switches 32a through 32c makes it possible to select each of the lead-acid storage batteries 12a through 12c to be connected to the power conversion part 10 and to the power conversion part 31. The switches 32a through 32c are controlled by the operation method control part 22 of the control apparatus 6. In this practical example, the operation method control part 22 connects any one of the lead-acid storage batteries 12a through 12c to the power conversion part 10, and the other two lead-acid storage batteries to the power conversion part 31.

Also, in FIG. 8, the other parts comprise the same functions as the parts having the same reference signs in the first practical example shown in FIG. 2.

Figure 9:
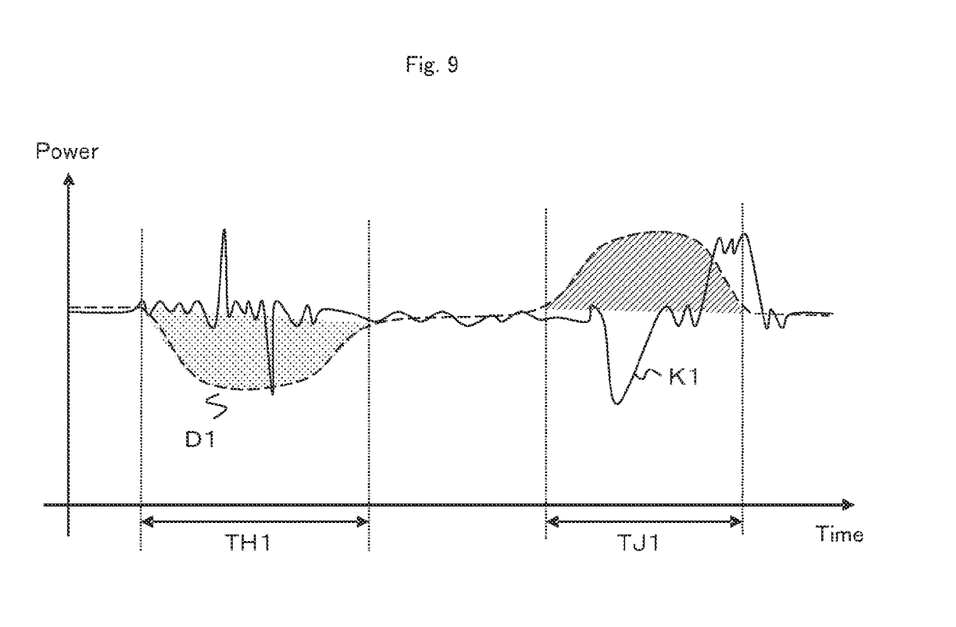
FIG. 9 is a drawing illustrating the states of a short-term fluctuation and a fluctuation in power consumption as a result of load in the power system 1.

FIG. 9 is a drawing illustrating the states of a short-term fluctuation and a fluctuation in power consumption due to load in the power system 1. The power of the power system 1 (curved line K1) and the power consumed due to load (curved line D1) are shown in FIG. 9.

As indicated by the curved line D1, the load connected to the power system has a period of time TH1 during which the power being used drops and a period of time TJ1 during which the power being used rises. The system stabilization system 3 of this practical example performs peak shifting in the power system 1 by carrying out charging from the power system 1 and storing the power in the lead-acid storage batteries during the period of time TH1 when power usage drops as a result of the load, and discharging power from the lead-acid storage batteries to the power system 1 during the period of time TJ1 when power usage rises due to load.

The lead-acid storage battery, which is connected to the power conversion part 10 and is used for suppressing a power fluctuation in the power system 1 (a short-term fluctuation in the power system 1) suppresses a fluctuation in power in the power system 1 by charging/discharging in accordance with control from the charge/discharge control part 21. Alternatively, the lead-acid storage batteries, which are connected to the power conversion part 31 and are used for storing power, perform power storage and discharge, and offset power consumption due to load in the power system 1 by charging/discharging in accordance with control from the charge/discharge control part 21.

The charge/discharge control part 21 control related to suppressing a power fluctuation in the power system 1 may be the same control as that of any of the first through the third practical examples described hereinabove. Alternatively, the charge/discharge control part 21 control for offsetting power consumption due to load, for example, may involve recording beforehand in the storage part 23 power consumption trend data indicating fluctuations in power consumption due to load acquired using statistics, and charging/discharging the lead-acid storage batteries so as to offset the fluctuations in power consumption indicated by the power consumption trend data. Also, the charge/discharge control part 21, in line with controlling the lead-acid storage batteries 12a through 12c, records in the storage part 23 the number of times each of the lead-acid storage batteries 12a through 12c is charged/discharged. As an example, the sum of the number of charges and the number of discharges is regarded as the number of charges/discharges here. Also, by treating a charge and discharge as a pair, the number of times that a charge/discharge pair occurs may also be regarded as the number of charges/discharges.

The operation method control part 22 reads the number of charges/discharges for each of the lead-acid storage batteries 12a through 12c recorded in the storage part 23 by the charge/discharge control part 21, and controls the switches 32a through 32c so as to connect the lead-acid storage battery having the smallest number of charges/discharges to the power conversion part 10 for use in suppressing short-term fluctuations, and to connect the remaining lead-acid storage batteries to the power conversion part 31 for power storage use. The operation method control part 22, for example, may carry out this control in a periodic manner.

According to this practical example, it is possible to carry out both the suppression of short-term fluctuations and power storage in the power system 1. Furthermore, in so doing, it is possible to equalize the number of charges/discharges of the lead-acid storage batteries 12a through 12c used to suppress short-term fluctuations and to store power, and to prolong the life of the lead-acid storage batteries 12a through 12c and consequently prolong the life of the system stabilization system 3.

Figure 10:
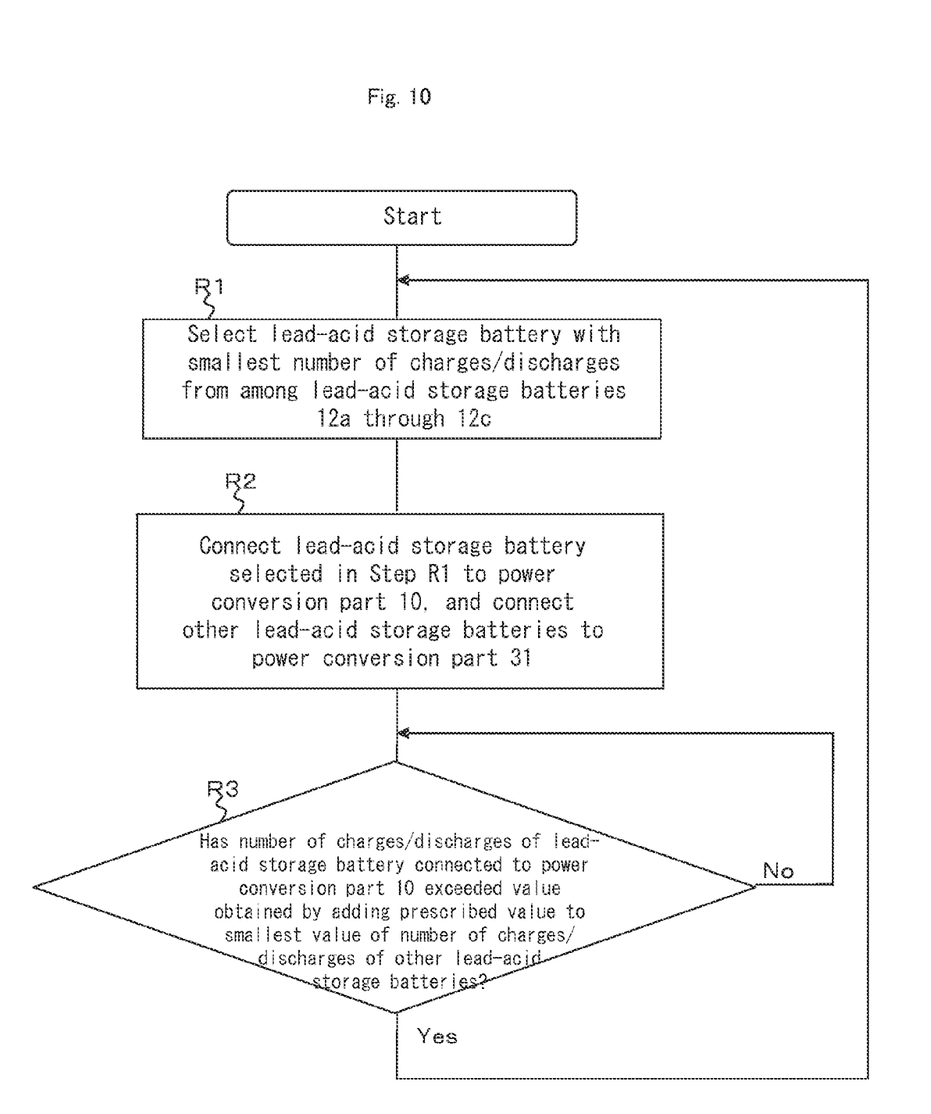
FIG. 10 is an example of a flowchart showing the process by which an operation method control part 22 determines a power input/output destination for lead-acid storage batteries 12a through 12c in the fourth practical example.

FIG. 10 is an example of a flowchart showing the process by which the operation method control part 22 determines power input/output destinations for the lead-acid storage batteries 12a through 12c in the fourth practical example.

First of all, in Step R1, the operation method control part 22 determines the lead-acid storage battery that has the smallest number of charges/discharges from among the lead-acid storage batteries 12a through 12c, and proceeds to Step R2.

In Step R2, the operation method control part 22 connects the lead-acid storage battery having the smallest number of charges/discharges determined in Step R1 to the power conversion part 10, connects the other lead-acid storage batteries to the power conversion part 31, and proceeds to Step R3.

In Step R3, the operation method control part 22 determines whether or not the number of charges/discharges of the lead-acid storage battery determined in Step R1 as having the smallest number of charges/discharges (that is, the lead-acid storage battery that was connected to the power conversion part 10 in Step R2) exceeds a value obtained by adding a preset setpoint to the smallest value of the number of charges/discharges of the other lead-acid storage batteries.

When the number of charges/discharges of the lead-acid storage battery determined in Step R1 as having the smallest number of charges/discharges exceeds a value obtained by adding a preset setpoint to the smallest value of the number of charges/discharges of the other lead-acid storage batteries, the operation method control part 22 proceeds to Step R1, and when the number of charges/discharges does not exceed the obtained value, proceeds to Step R3.

The embodiments and practical examples of the present invention have been explained hereinabove, but the present invention is not limited thereto, and includes all sorts of variations. For example, the above-described practical examples were explained in detail to illustrate the present invention in an easy-to-understand manner, and the present invention is not necessarily limited to arrangements that provide all of the configurations that were explained. Also, it is possible to replace a part of the configuration of a certain practical example with the configuration of another practical example, and it is also possible to add the configuration of another practical example to the configuration of the certain practical example. It is also possible to add another configuration as part of each practical example, to delete a part of the configuration of each practical example, and to replace a part of each practical example with another configuration.

Also, the configuration, function, and processing of each part described hereinabove may be realized using hardware, for example, by designing either all or a portion thereof as an integrated circuit. The configuration, function, and processing of each part described hereinabove may also be realized by interpreting and executing a software program that allows a processor to realize the respective functions. A software program, a table, a file and other such information for realizing the functions can be stored in a memory and/or a recording apparatus such as a hard disk, a solid state drive (SSD) and so forth, or an IC card, an SD card, a DVD or other such recording medium.

Furthermore, in the explanations of the practical examples, control lines and information lines are illustrated as deemed necessary for the sake of explanation. Not all of the provided control lines and information lines will necessarily be indicated in a product to which the present invention has been applied. Actually, practically all of the configurations may be thought of as being connected to one another in accordance with the control lines and information lines.

REFERENCE SIGNS LIST

1 Power system
10 Power conversion part
11 Lithium ion capacitor
12, 12a through 12c Lead-acid storage battery(ies)
13 Central power supply center
2 Renewable energy power generation facility
21 Charge/discharge control part
22 Operation method control part
23 Storage part
3 System stabilization system
31 Power conversion part
32a Switch
4 Capacitor apparatus
5 Power storage apparatus
6 Control apparatus
7 Frequency detector
8 Power detector
9 Power conversion part

The invention claimed is:

1. A system stabilization system for suppressing power fluctuations in a power system, the system stabilization system comprising:
 a power storage apparatus configured to suppress a power fluctuation in the power system by either charging or discharging in response to a control;
 a capacitor apparatus configured to suppress the power fluctuation in the power system by making the charge/discharge response to control faster than the power storage apparatus, and charging or discharging in response to the control; and
 a control apparatus configured to control the power storage apparatus and the capacitor apparatus so as to reduce occurrences of charging or discharging in the power storage apparatus,
 wherein the control apparatus determines whether the charging or discharging of the capacitor apparatus has started based on detection of the power fluctuation in the power system,
 wherein the control apparatus, when it is determined that the charging or discharging of the capacitor has started, determines whether a prescribed period of time has elapsed, and
 wherein the control apparatus, when the prescribed period of time has not elapsed and when a state-of-charge of the capacitor apparatus has reached a prescribed charge threshold, starts either the charging or the discharging of the power storage apparatus to suppress the power fluctuation.

2. The system stabilization system according to claim 1, wherein the control apparatus starts either the charging or the discharging of the capacitor apparatus when a power fluctuation is detected in the power system, and starts either the charging or the discharging of the power storage apparatus when the power fluctuation in the power system is detected continuously in excess of a prescribed short-term fluctuation period.

3. The system stabilization system according to claim 2, wherein the capacitor apparatus comprises capacitance capable of absorbing the power fluctuation in the power system until the power storage apparatus, which has started either charging or discharging after the elapse of the short-term fluctuation period, is able to suppress the power fluctuation in the power system.

4. The system stabilization system according to claim 2, wherein the short-term fluctuation period is determined based on a characteristic of a power fluctuation generated by a power generation apparatus that causes a power fluctuation in the power system.

5. The system stabilization system according to claim 2, further comprising:
 a frequency detector for detecting a frequency of the power system, wherein
 the control apparatus compares a frequency detected by the frequency detector with a prescribed frequency threshold, and when the frequency reaches the frequency threshold, detects the power fluctuation in the power system and starts either the charging or the discharging of the capacitor apparatus.

6. The system stabilization system according to claim 1, wherein the control apparatus starts either the charging or the discharging of the capacitor apparatus when a power fluctuation is detected in the power system, and starts either the charging or the discharging of the power storage apparatus when a time until the state-of-charge of the capacitor apparatus reaches a prescribed charge threshold is equal to or less than a time until power that is to be either charged or discharged to or from the power storage apparatus when either the charging or the discharging of the power storage apparatus has started reaches an amount of power capable of suppressing a power fluctuation in the power system.

7. The system stabilization system according to claim 1, wherein
 the power storage apparatus comprises a plurality of storage batteries, and
 the control apparatus measures the number of charges/discharges for each of the plurality of storage batteries, regards a storage battery performing the smallest number of charges/discharges as a system fluctuation suppressing storage battery for suppressing a power fluctuation in the power system, regards the remaining storage battery as a load use offset storage battery for offsetting the use of power in the power system due to load, charges the load use offset storage battery in a time period during which a small amount of power is being used due to load, and discharges the load use offset storage battery in a time period during which a large amount of power is being used due to load.

8. The system stabilization system according to claim 1, wherein the capacitor apparatus comprises a lithium ion capacitor, and is an apparatus for charging and discharging the lithium ion capacitor.

9. A system stabilization method for suppressing a power fluctuation in a power system using a system stabilization system that includes a power storage apparatus configured to suppress a power fluctuation in the power system by either charging or discharging in response to a control, and a capacitor apparatus configured to suppress the power fluctuation in the power system by making the charge/discharge response to control faster than the power storage apparatus and charging or discharging in response to the control, the system stabilization method comprising:
 determining, using a control apparatus, whether the charging or discharging of the capacitor apparatus has started based on detection of the power fluctuation in the power system;

determining, using the control apparatus when it is determined that the charging or discharging of the capacitor has started, whether a prescribed period of time has elapsed; and starting, using the control apparatus when the prescribed period of time has not elapsed and when a state-of-charge of the capacitor apparatus has reached a prescribed charge threshold, either the charging or the discharging of the power storage apparatus to suppress the power fluctuation.

10. The system stabilization method according to claim 9, comprising:

a step of starting either the charging or the discharging of the capacitor apparatus when a power fluctuation is detected in the power system; and a step of starting either the charging or the discharging of the power storage apparatus when power fluctuation in the power system is detected continuously in excess of a prescribed short-term fluctuation period.

11. The system stabilization method according to claim 9, comprising:

a step of starting either the charging or the discharging of the capacitor apparatus when a power fluctuation is detected in the power system; and a step of starting either the charging or the discharging of the power storage apparatus when the state-of-charge of the capacitor apparatus reaches a prescribed charge threshold.

12. The system stabilization method according to claim 9, comprising:

a step of starting either the charging or the discharging of the capacitor apparatus when a power fluctuation is detected in the power system; and a step of starting either the charging or the discharging of the power storage apparatus when a time until the state-of-charge of the capacitor apparatus reaches a prescribed charge threshold is equal to or less than a time until power that is to be either charged or discharged to or from the power storage apparatus when either the charging or the discharging of the power storage apparatus has been started reaches an amount of power capable of suppressing a power fluctuation in the power system.

13. The system stabilization method according to claim 9, wherein the power storage apparatus includes a plurality of storage batteries, the system stabilization method comprising:

a step of measuring the number of charges/discharges for each of the plurality of storage batteries;

a step of regarding a storage battery performing the smallest number of charges/discharges as a system fluctuation suppressing storage battery for suppressing a power fluctuation in the power system, and regarding the remaining storage battery as a load use offset storage battery for offsetting the use of power in the power system due to load;

a step of charging the load use offset storage battery in a time period during which a small amount of power is used due to load; and a step of discharging the load use offset storage battery in a time period during which a large amount of power is used due to load.

14. The system stabilization method according to claim 9, wherein the capacitor apparatus comprises a lithium ion capacitor, and is an apparatus for charging and discharging the lithium ion capacitor.

* * * * *